United States Patent [19]
Kato et al.

[11] Patent Number: 5,852,929
[45] Date of Patent: Dec. 29, 1998

[54] FAILURE DETECTION SYSTEM OF EXHAUST SECONDARY AIR SUPPLY SYSTEM OF INTERNAL COMBUSTION ENGINE

[75] Inventors: Hiroaki Kato; Yuichi Shimasaki; Takashi Komatsuda; Takuya Aoki; Hiroaki Muramatsu; Hajime Uto; Toshiaki Ichitani, all of Wako, Japan

[73] Assignee: Honda Giken Kogyo Kabushiki Kaisha, Tokyo, Japan

[21] Appl. No.: 677,315

[22] Filed: Jul. 2, 1996

[30] Foreign Application Priority Data

Jul. 4, 1996 [JP] Japan .................................. 7-191246

[51] Int. Cl.$^6$ ................................ F01N 3/20; F01N 3/32
[52] U.S. Cl. .................................. 60/274; 60/277; 60/289
[58] Field of Search .............................. 60/274, 276, 277, 60/289, 290

[56] References Cited

U.S. PATENT DOCUMENTS

| | | | |
|---|---|---|---|
| 5,333,446 | 8/1994 | Itoh | 60/277 |
| 5,381,658 | 1/1995 | Meguro | 60/277 |
| 5,388,401 | 2/1995 | Nishizawa et al. | 60/277 |
| 5,400,591 | 3/1995 | Aramaki | 60/277 |
| 5,526,642 | 6/1996 | Dambach et al. | 60/277 |
| 5,542,292 | 8/1996 | Schneider et al. | 60/277 |
| 5,615,552 | 4/1997 | Shimasaki et al. | 60/277 |
| 5,706,653 | 1/1998 | Shoji et al. | 60/277 |

FOREIGN PATENT DOCUMENTS

| | | |
|---|---|---|
| 1-232246 | 9/1989 | Japan . |
| 2-24550 | 1/1990 | Japan . |
| 6-42342 | 2/1994 | Japan . |

*Primary Examiner*—Willis R. Wolfe, Jr.
*Attorney, Agent, or Firm*—Nikaido Marmelstein Murray & Oram LLP

[57] ABSTRACT

A failure detection system detects a failure occurring in an exhaust secondary air supply system of an internal combustion engine, and has a catalytic converter installed in an exhaust pipe of an exhaust system of the engine for reducing pollutants from exhaust gases emitted from the engine, a conduit connected, at one end, to the exhaust pipe at a location upstream of the catalytic converter and an air pump connected to an opposite end of the conduit for supplying compressed air in the conduit. The conduit is closed by the a valve which opens in response to the negative pressure and a second valve which opens in response to the conduit pressure. In the system a first prescribed level and the second prescribed level are set and two pressure switches are provided for generating output at the levels. A failure occurring in the air pump and the valve is detected based on operation of the air pump and the output of the pressure detectors. Alternatively, the failure is detected by changing the timing of the termination of the air pump and closing of the second valve while using one switch and the second prescribed level. The system is simple in configuration.

18 Claims, 5 Drawing Sheets

FAILURE DETECTION SYSTEM OF EXHAUST SECONDARY AIR SUPPLY SYSTEM OF INTERNAL COMBUSTION ENGINE

BACKGROUND OF THE INVENTION

1. Field of the Invention

This invention relates to a system and a method for detecting a failure or trouble of an exhaust secondary air supply system of an internal combustion engine, and more particularly to a system and a method for detecting a failure or trouble occurring in an air pump which supplies compressed air to the engine exhaust and an open/close valve which regulates the compressed air supplied to the engine exhaust system.

2. Description of the Related Art

An internal combustion engine usually has a three-way catalytic converter in the exhaust system which reduces all three types of CO, HC, and NOx emissions that escape through the exhaust system, and which removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

The electrically heated catalytic converter has an electric heater that, when supplied with current, burns off the unburned exhaust gases generated by the engine and passing through the engine exhaust to promote the activation of the catalytic converter itself and other ordinary catalytic converter(s) installed downstream thereof. The electrically heated catalytic converter is often paired with an air pump which forcibly supplies air to the engine exhaust to encourage HC, CO emissions to oxidize, thereby enhancing exhaust gas purification efficiency.

More particularly, the exhaust secondary air supply system has such an air pump which is installed at a far end of an air supply conduit connected to the exhaust pipe at a position upstream of the location where the electrically heated catalytic converter is placed, and an open/close valve located in the air supply conduit for regulating air flow. Japanese Laid-Open Patent Application No. 6(1994)-42,342 teaches this type of exhaust secondary air supply system.

Since a failure or trouble occurring in the air pump and the open/close valve in the exhaust secondary air supply system degrades the exhaust gas purification efficiency, it is necessary to detect any failure occurring in the air pump and the valve. Conventionally, the current and voltage supplied to the air pump motor were monitored to detect whether a failure or trouble has occurred in the air pump. Disadvantageously, the conventional system was complicated in configuration and in addition, was unable to detect a failure or trouble occurring in the open/close valve in the exhaust secondary air supply system.

An object of the invention is therefore to solve the drawback of the prior art system and to provide a system and a method for easily detecting a failure or trouble occurring in the air pump and/or the open/close valve of the exhaust secondary air supply system of an internal combustion engine.

SUMMARY OF THE INVENTION

In order to achieve the object, the present invention provides a system for detecting a failure of an exhaust secondary air supply system of an internal combustion engine, comprising a catalytic converter installed in an exhaust pipe of an exhaust system of the engine for reducing pollutants from exhaust gases emitted from the engine, a conduit connected, at one end, to the exhaust pipe at a location upstream of the catalytic converter, an air pump connected to an opposite end of the conduit for supplying air in the conduit, a valve provided in the conduit for closing/opening the conduit, a pressure detector for detecting a pressure in the conduit which generates outputs indicative of the pressure, and failure detecting means for detecting a failure occurring at least one of the air pump and the valve based on operation of the air pump and the output of the pressure detector.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
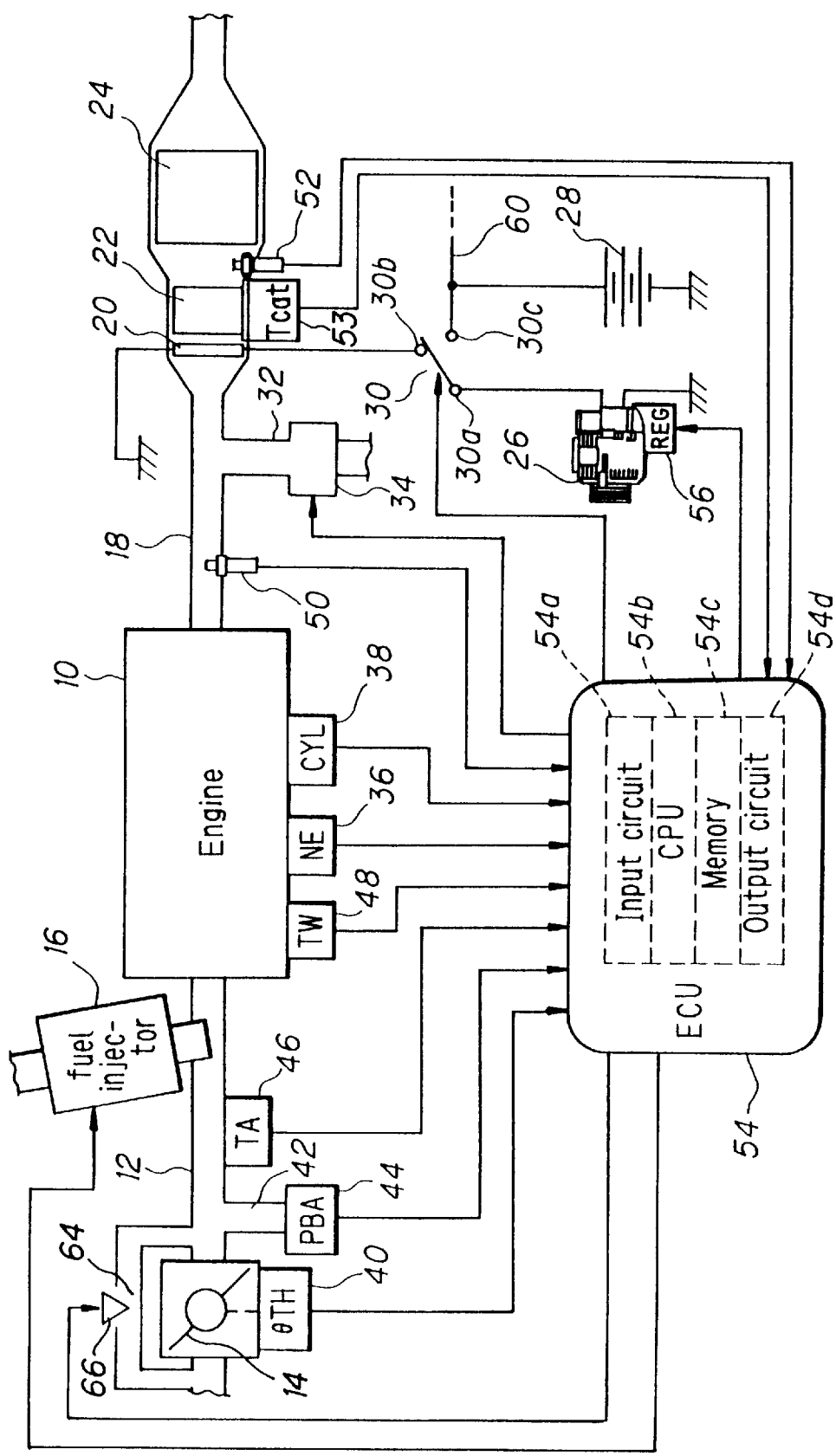
FIG. 1 is an overall schematic view showing a system for detecting a failure or trouble of an exhaust secondary air supply system of an internal combustion engine according to the invention.

FIG. 1 is an overall schematic view showing a system for detecting a failure or trouble of an exhaust secondary air supply system of an internal combustion engine according to the invention.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, in order from the upstream side, the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system. The start catalytic converter 22 (known as a "light-off catalyst") is configured to have a relatively small diameter and volume and is provided in particular for enhancing catalyst conversion efficiency immediately after engine starting.

The body of the EHC 20, i.e., a carrier that carries the catalyst is made of a metal mesh. The metal mesh is manufactured by extruding metallic materials, then by sintering them to a ceramic bar, and then by cutting the bar into disc-shaped slices of 10 cm thickness. The metal mesh is provided with slits to form a current supply path therebetween. Thus, the metal mesh itself is configured to be an electric heater. The current path has an anode and a cathode at opposite ends thereof.

As illustrated in the figure, an alternator 26 is provided in the vicinity of the engine 10. The alternator 26 is connected to the crankshaft (not shown) of the engine 10 and is driven to produce electric energy. The generated electric energy is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying compressed air (secondary air). Since a large amount of unburned gases are produced at engine starting, the air pump 34 is installed to supply compressed air (secondary air) to the exhaust pipe 18 to promote burning, thereby enhancing conversion efficiency of the catalysts. The details of the exhaust secondary air supply system will be explained later.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14. The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant is provided at a suitable location of the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The first and second $O_2$ sensors are respectively provided with a heater which heats up the detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)-24,550, no further explanation thereof will be made.

The signals output from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including a motor (not shown in FIG. 1) of the air pump 34. The CPU 54b controls the operation of the air pump 34 by controlling the operation of the motor, and controls fuel metering through the fuel injector 16.

Figure 2:
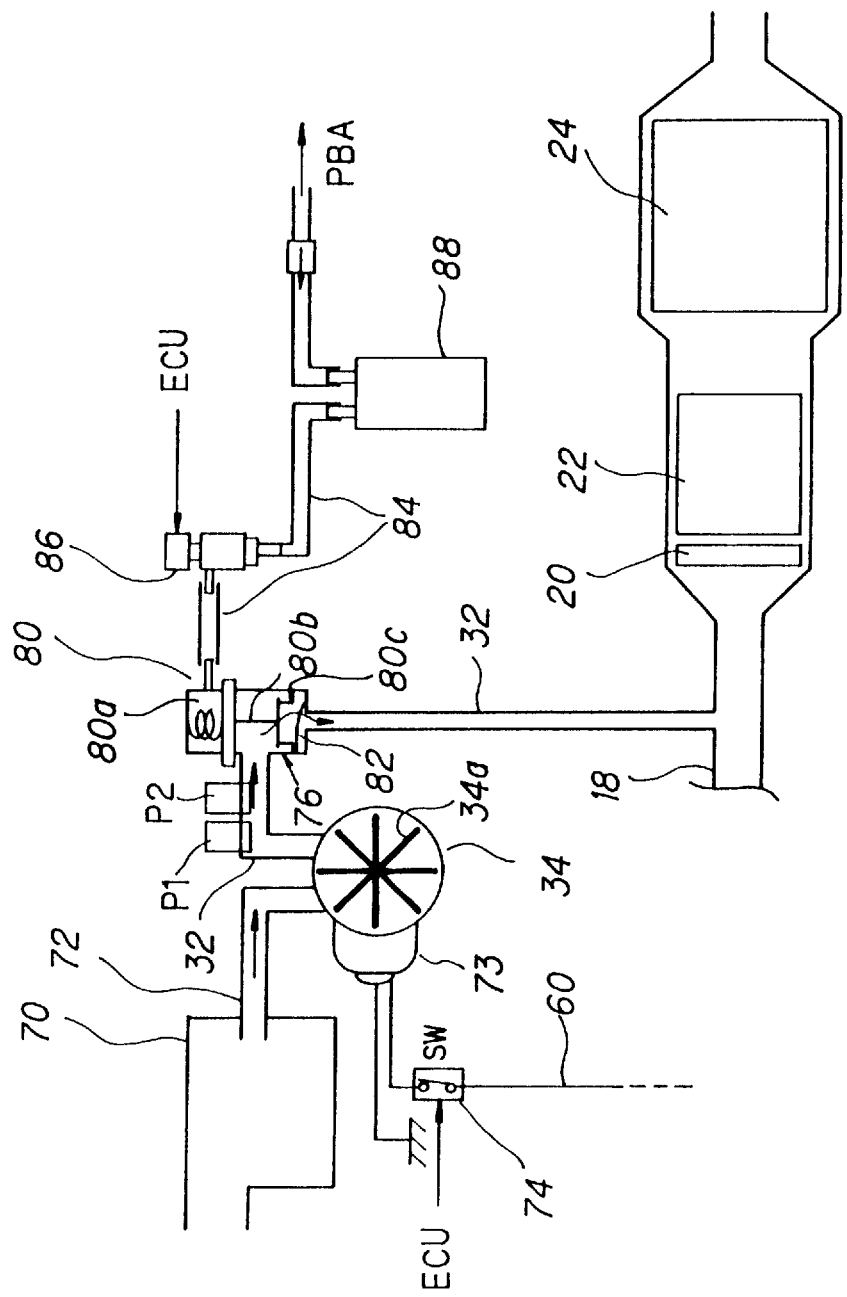
FIG. 2 is a view showing the exhaust secondary air supply system in detail illustrated in FIG. 1.

FIG. 2 is an explanatory view showing the exhaust secondary air supply system in detail.

As referred to earlier, the conduit 32 through which the air compressed by the air pump 34 flows, is connected to the exhaust pipe 18 at a location upstream (in terms of exhaust gas flow) of the EHC 20, etc. The air pump 34 is in turn connected with an air cleaner 70 via a second conduit 72 such that it draws fresh air filtered by the air cleaner 70 through the conduit 72 to forcibly supply the compressed air to the exhaust pipe 18 through the air supply conduit 32. The driver circuit of an electric motor 73 of the air pump 34 is connected to the aforesaid power supply line 60 via a switch 74. The ECU 54 controls the operation of the air pump motor 73 by opening/closing the switch 74.

The air supply conduit 32 is provided with the aforesaid open/close valve (hereinafter referred to as a "cut valve") 76. The cut valve 76 comprises an air switching valve 80 and a reed valve 82. The air switching valve 80 has a diaphragm (not shown) to form a chamber 80a that is connected with the air intake pipe 12, as illustrated in FIG. 1, via a passage 84, at a location downstream of the throttle valve 14. The passage 84 is equipped with a solenoid valve (electromagnetic valve) 86 which is driven by the ECU 54 and when energized (turned to ON), it opens the passage 84. When the passage 84 is opened, the manifold pressure PBA (negative pressure) is drawn to the chamber via a vacuum tank 88 to pull a valve member 80*b* resting on a valve seat 80*c* therefrom in the direction upward in the figure.

The reed valve 82 is made of an elastic plate whose end is cantilevered back at the edge of the valve seat 80*c* in such a manner that the opposite free end closes the central hole of the valve seat 80*c*. As a result, when the air switching valve member 80*b* is pulled upward as mentioned above, the air forcibly supplied by the air pump 34 flows through a gap generated between the valve member 80*b* and the valve seat 80*c* to exert a pushing force on the reed valve 82. The reed valve 82 is accordingly pushed down and when the pushing force has reached a predetermined level, the reed valve free end bends away from the back of the valve seat 80*b*. Consequently, the air passes through the valve seat central hole in the direction shown by the arrow in the figure, flows through the exhaust pipe 18, and reaches the EHC 20, etc., to promote the oxidization of the emissions in the exhaust gases.

The plate forming the reed valve 82 is configured to have a plane area which is greater than the central hole of the valve seat 80*c*. Thus, the reed valve 82 operates as a kind of check valve to prevent the exhaust gases from flowing reversely through the air supply conduit 32 towards the air pump 34.

The conduit 32 is provided with two pressure detectors such as pressures switches P1, P2 between the air pump 34 and the cut valve 76. As will be explained with reference to FIG. 4, the first pressure switch P1 is configured to output or generate an ON signal when the pressure in the conduit 32 (compressed air pressure generated by the pump 34) has reached a first prescribed level which is set lower than the valve opening pressure under which the reed valve 82 is opened. Similarly, the second pressure switch P2 outputs or generates an ON signal when the conduit pressure has reached a second prescribed level which is set higher than the reed valve opening pressure.

In the air intake side in the figure, the air intake pipe 12 is provided with a secondary air intake pipe 64 which bypasses the location where the throttle valve 14 is placed. An electro-magnetic valve 66 is provided to open/close the secondary air intake pipe 12. The CPU 54*b* controls the engine speed to a desired idle speed by regulating the amount of air passing through the secondary air intake pipe 64 by generating and supplying pulse trains of the pulse-width modulation to a driver circuit of the electro-magnetic valve 66 that determines the amount of lifting or stroke of the valve 66.

Figure 3:
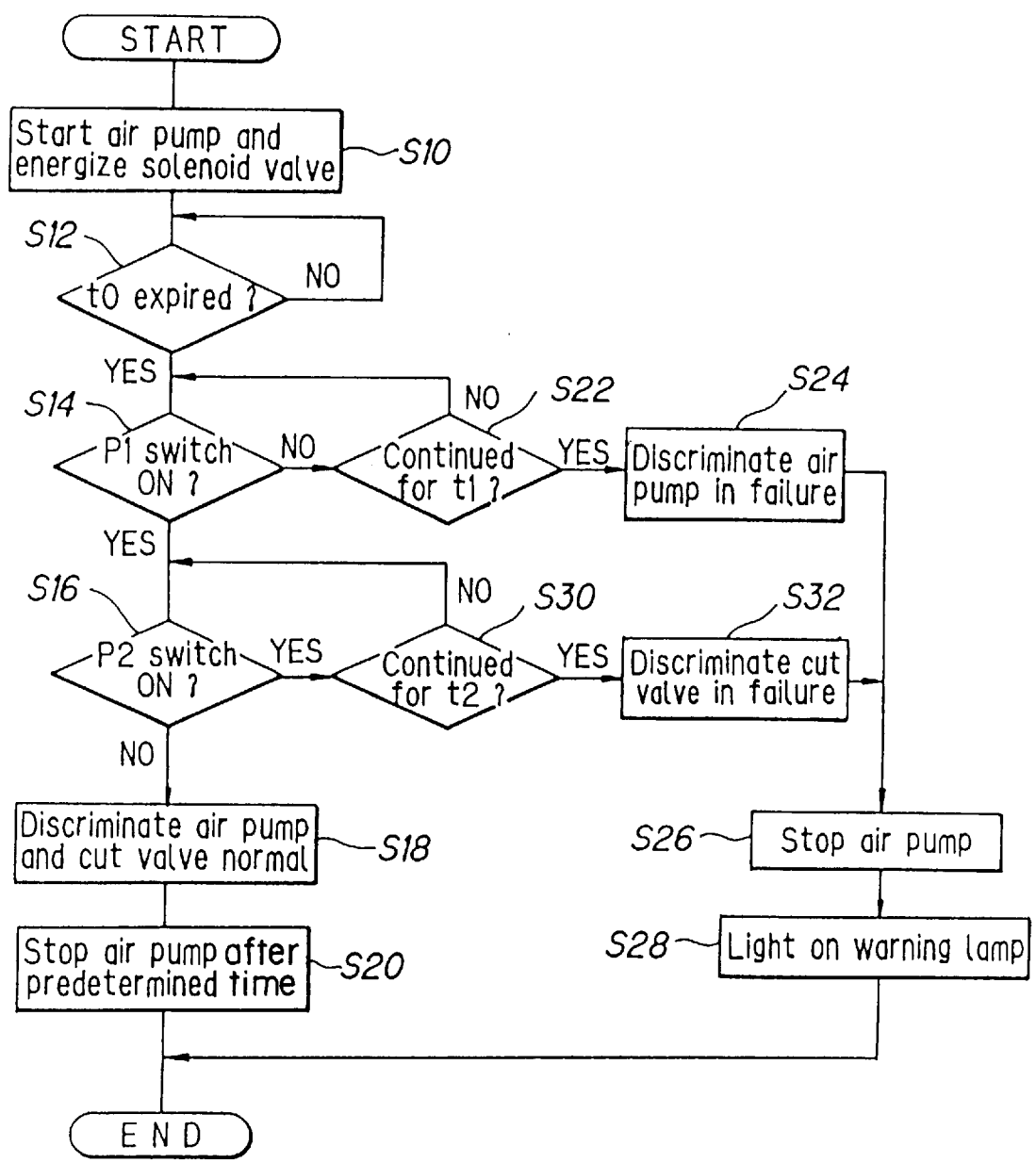
FIG. 3 is a flowchart showing the operation of the system illustrated in FIG. 1.
Figure 4:
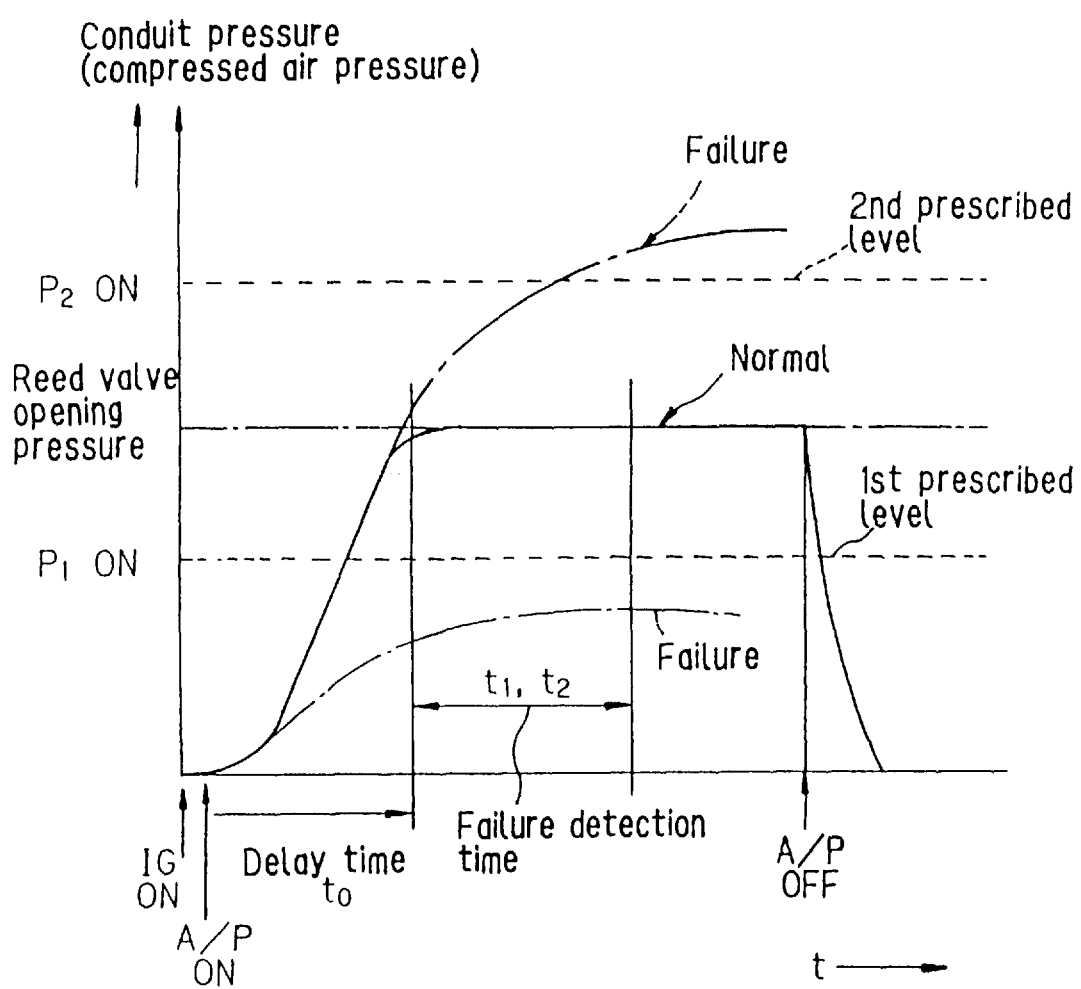
FIG. 4 is a timing chart showing the operation of the system illustrated in FIG. 3.

FIG. 3 is a flowchart showing the operation of the system according to the invention and FIG. 4 is a timing chart explaining the operation.

Explaining this with reference to the flowchart of FIG. 3, the program starts at S10 in which the air pump 34 is started to operate and at the same time, the solenoid valve 86 is energized to introduce the manifold pressure (negative pressure) PBA to open the air switching valve 80. Since the exhaust secondary air supply system assists the oxidization of the emissions at the time of the current supply to the EHC 20, the program illustrated in FIG. 3 is activated in synchronization with the current supply control to the EHC 20 carried out through a routine (not shown).

The program then proceeds to S12 in which it is checked whether a predetermined time t0 has passed. The time t0 is, as illustrated in FIG. 4, a delay time until the rotation of impellers 34*a* of the air pump 34 has become stable such that the pressure in the conduit 32 has reached a predetermined value. In other words, it is checked in the step whether a waiting time for failure detection has passed.

When the result in S12 is affirmative, the program goes to S14 in which it is checked whether the first pressure switch P1 outputs the ON signal and if it does, the program goes to S16 in which it is checked whether the second pressure switch P2 outputs the ON signal.

As will be illustrated in FIG. 4, the conduit pressure (compressed air pressure) starts to rise upon the operation of the air pump 34 and continues to rise beyond the first prescribed level. Since the air switching valve 80 is left open, when the conduit pressure has reached the reed valve opening pressure, the read valve 82 is pushed to open and the compressed air then flows to the exhaust pipe 82. As a result, the conduit pressure (compressed air pressure) will be kept in the vicinity of the reed valve opening pressure. Specifically, the conduit pressure will be held less than the second prescribed level.

As a result, if the first pressure switch P1 outputs the ON signal, but the second pressure switch P2 does not output the ON signal, it can be discriminated that both the air pump 34 and the cut valve 76 are normal. The program therefore goes to S18 in which it is discriminated to that effect and to S20 in which the switch 74 is turned to OFF to stop the air pump 34, after a predetermined time has passed, simultaneously with the termination of the current supply control to the EHC 20.

On the other hand, when S14 finds that the pressure switch P1 does not output the ON signal, the program goes to S22 in which it is checked whether the OFF condition continues for a time t1. If the result is affirmative, the program goes to S24 in which it is discriminated that a failure or trouble has occurred in the air pump 34, to S26 in which the air pump is stopped, and to S28 in which a warning such as lighting on a warning lamp is made.

This is because when the conduit pressure is left below the first prescribed level for a time (i.e., the time t1), it can be considered that the air pump 34 does not operate for a reason such as the impellers 34*a* are stuck such that the desired compressed air is not produced. Otherwise, the reed valve 82 may be stuck to open, or there is a leakage in the conduit 32.

On the other hand, when the result in S22 is negative, the OFF condition may be caused by noise or some other temporary reason. Therefore, the program returns to S 14 and no failure detection is made.

Moreover, when S16 finds that the second pressure switch P2 outputs the ON signal, the program goes to S30 in which it is checked whether the ON condition continues for a time t2 so as to confirm that the ON condition is not due to noise or some other temporary reason, and the program goes to S32 in which it is discriminated or detected that a failure or trouble has occurred in the cut valve 76.

This is because the fact that the conduit pressure becomes higher than the second prescribed level would mean that the air switching valve 80 and/or the reed valve 32 (constituting the cut valve 76) is (are) stuck to close, or the conduit 32 is clogged. As a result, the program goes to S32 to discriminate the failure, and to S26, S28 in the same manner mentioned before. These situations are illustrated in FIG. 4.

Having been configured in the foregoing manner, the system in the embodiment can easily detect if a failure or trouble has occurred in the air pump, the cut valve and the conduit constituting the exhaust secondary air supply system. Moreover, the system only requires two pressure sensors to be added, thus the configuration is not complicated.

Figure 5:
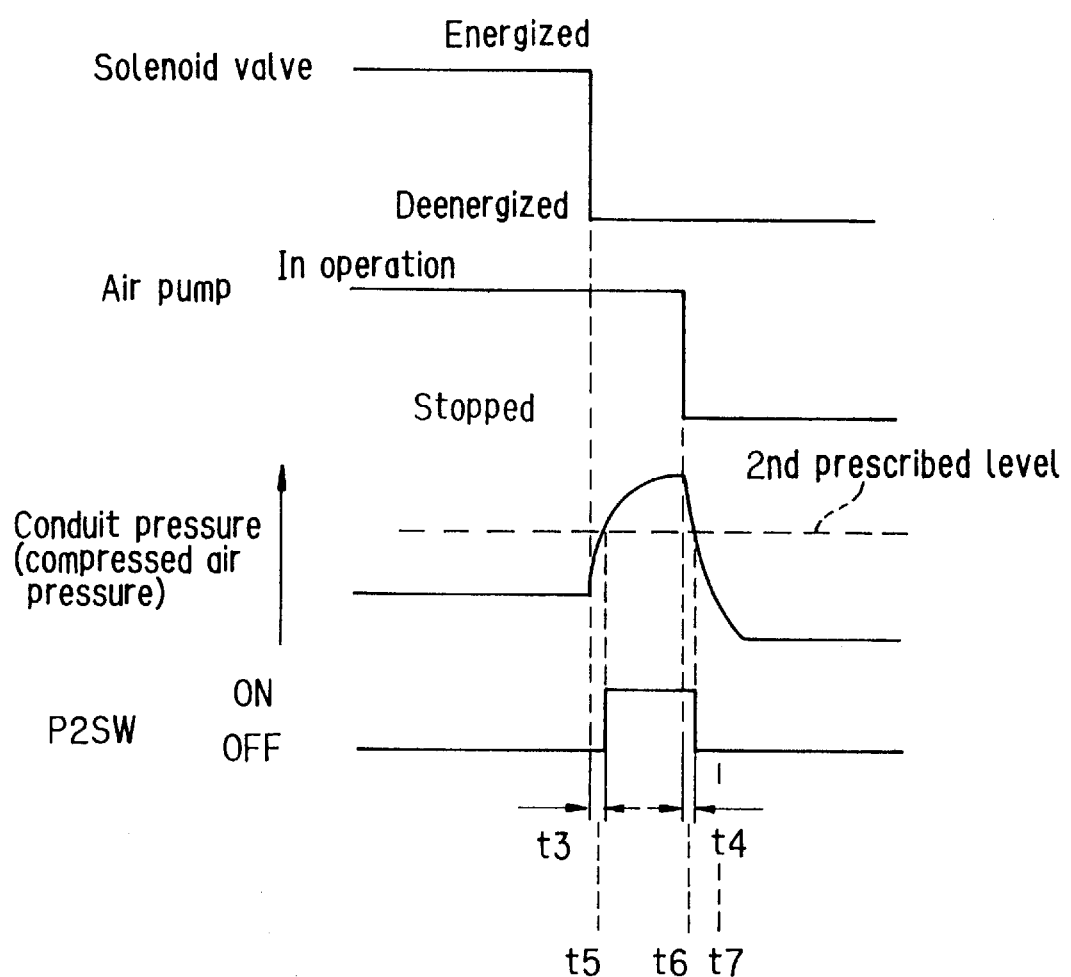
FIG. 5 is a timing chart showing the operation of the system according to a second embodiment of the invention.

FIG. 5 is a timing chart showing the operation of the system according to a second embodiment of the invention.

As illustrated in the figure, the second embodiment is configured such that the operation, more precisely the termination, of the air switching valve and the air pump is made different in time, while using only one pressure switch (the second pressure switch P2), ensuring to detect if a failure or trouble has occurred in the air pump and the cut valve. Specifically, the failure detection is carried out at a timing close to the termination of an ordinary exhaust secondary air supply carried out simultaneously with the current supply to the EHC 20.

Explaining this with reference to FIG. 5, the solenoid valve 86 is first energized to open the air switching valve 80 and at the same time, the air pump is started to operate. At that instant, when the pressure switch P2 outputs the ON signal, it can be discriminated or detected that a failure or trouble has occurred in the cut valve from the same reason mentioned in the first embodiment.

Then, after expiration of a predetermined period such as upon termination of the current supply to the EHC 20, the solenoid valve 86 is deenergized, in synchronism with the termination of the current supply, to close the air switching valve 80. Then, after expiration of a delay time t3, it is checked whether the pressure switch P2 outputs the ON signal.

As illustrated in the figure, since the air pump is still in operation, while the cut valve 76 is kept closed, the conduit pressure must continuously rise beyond the second prescribed level. Consequently, if the pressure switch P2 does not output the ON signal, it can be estimated that the air switching valve 80 and/or the reed valve 82 would be stuck to open or have a leakage, or the conduit 32 has a leakage.

Then, after expiration of a time (e.g., 1.0 second or more), the air pump is also stopped as is shown in the figure. And, after expiration of a delay time t4, it is checked whether the pressure switch P2 outputs the ON signal.

At that time, as illustrated in the figure, upon the termination of the air pump, the conduit pressure must go through the air pump and drop below the second prescribed level. Accordingly, if the pressure switch P2 outputs the ON signal, it can be estimated that the air pump does not stop and is in failure.

Moreover, when the termination of the solenoid valve and the air pump is made different with respect to time, the failure detection can be conducted by progressively detecting the signals output by the pressure switch P2 at times t5, t6 and t7 as illustrated in the bottom of the figure. Here, t5 is the time at which the solenoid valve 86 is deenergized, t6 is the time immediately after the air pump 34 is stopped, and t7 is a time (later from t6) at which the conduit pressure drops.

Specifically, when the exhaust secondary air supply system is normal, as will be apparent from the figure, the output of the pressure switch P2 will be OFF at t5, ON at t6 and OFF at t7. Thus, when the outputs are OFF-ON-OFF, it can be discriminated or estimated that the system is normal.

Consequently, when the outputs are ON-ON-OFF, it can be discriminated or estimated that the cut valve is stuck to close or the conduit is clogged. This is because the output is different at t5 from that in normal condition. The reason why the conduit pressure exceeds the second prescribed level at t5 is considered that the conduit has been clogged before the solenoid valve was deenergized, in other words, the cut valve is stuck to close or some similar situations.

Moreover, if the outputs are OFF-ON-ON, since the conduit pressure does not drop at t7, it can be discriminated or estimated that the air pump does not stop. If OFF-OFF-OFF, it can be discriminated or estimated that the air pump does not operate, the compressed air volume is insufficient, the cut valve is stuck to open, the conduit has a leakage, or the cut valve has a large leakage etc. This is because the conduit pressure does not rise at t6.

In the second embodiment, since the termination of the solenoid valve and the air pump are different in time, the system can easily detect a failure or trouble occurring in the exhaust secondary air supply system. Moreover, the system makes it possible to estimate at which component or portion a failure or trouble has occurred. Although the estimation is an estimation and not a perfect detection, it can indicate the component or portion with a considerable degree of certainty. Furthermore, since the number of pressure switches is decreased to one, the configuration is further made simpler than the first embodiment.

It should be noted in the foregoing that, although a pressure switch is used as a pressure detector, a pressure sensor may instead be used.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A computer program for detecting a failure of an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

a valve provided in the conduit for closing/opening the conduit;

prescribed level setting means for setting a first prescribed level which indicate a pressure below a pressure that opens the valve and a second prescribed level which indicates a second pressure above the pressure that opens the valve; and a plurality of pressure detectors including at least a first pressure detector which outputs a signal at the first prescribed level and a second pressure detector which outputs a signal at the second prescribed level;

wherein the computer program comprises the step of:
detecting a failure occurring at least one of the air pump and the valve based on operation of the air pump and the output of the pressure detectors.

2. A computer program embodied on a computer-readable medium for detecting a failure of an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

valve means provided in the conduit for closing/opening the conduit, the valve means comprises a first valve which opens in response to a negative pressure and a second valve which opens in response to a pressure in the conduit;

first valve operation control means for controlling operation of the first valve by supplying the negative pressure from the engine;

prescribed level setting means for setting a prescribed level above a pressure under which the second valve opens; and a pressure detector which outputs a signal when a pressure in the conduit reaches the prescribed level;

wherein the computer program comprise the steps of:

checking the signal from the pressure detector successively with respect to time including at least at a first time when the supply of the negative pressure to the first valve is terminated and at a second time, which is different from the first time, when the air pump is terminated; and detecting a failure occurring at at least one of the air pump and the valve means based on a result of the checking.

3. A method for detecting a failure of an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

a valve provided in the conduit for closing/opening the conduit;

prescribed level setting means for setting a first prescribed level which indicate a pressure below a pressure that opens the valve and a second prescribed level which indicates a second pressure above the pressure that opens the valve; and a plurality of pressure detectors including at least a first pressure detector which outputs a signal at the first prescribed level and a second pressure detector which outputs a signal at the second prescribed level;

wherein the method comprises the step of:

detecting a failure occurring at least one of the air pump and the valve based on operation of the air pump and the output of the pressure detectors.

4. A method according to claim 3, wherein detecting that a failure has occurred in the air pump if the output of the first pressure detector indicates that the pressure in the conduit is below a first prescribed level when the air pump is in operation while the valve is closed.

5. A method according to claim 3, wherein detecting that a failure has occurred in the valve if the output of the second pressure detector indicates that the pressure in the conduit is above the second prescribed level, when the air pump is in operation while the valve is opened.

6. A method according to claim 3, wherein said valve comprises:

a first valve which opens when a negative pressure is supplied from the engine; and a second valve which opens in response to the pressure in the conduit;

and detecting that a failure has occurred in the air pump based on the output of the first pressure detector when the air pump is in operation, while supply of the negative pressure is stopped.

7. A method according to claim 3, wherein detecting a failure has occurred at least one the air pump and the valve after a predetermined has passed since at least one of the pressure detectors generated the output.

8. A method for detecting a failure of an exhaust secondary air supply system of an internal combustion engine, having:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

valve means provides in the conduit for closing/opening the conduit, the valve means comprises a first valve which opens in response to a negative pressure and a second valve which opens in response to a pressure in the conduit;

first valve operation control means for controlling operation of the first valve by supplying the negative pressure from the engine;

prescribed level setting means for setting a prescribed level above a pressure under which the second valve opens; and a pressure detector which outputs a signal when a pressure in the conduit reaches the prescribed level;

wherein the method comprise the steps of:

checking the signal from the pressure detector successively with respect to time including at least at a first time when the supply of the negative pressure to the first valve is terminated and at a second time, which is different from the first time, when the air pump is terminated; and detecting a failure occurring at at least one of the air pump and the valve means based on a result of the checking.

9. A method according to claim 8, wherein detecting a failure has occurred in at least one of the first valve and the second valve based the result of checking when the air pump is in operation while the supply of the negative pressure to the first valve is terminated.

10. A method according to claim 8, wherein detecting a failure has occurred in the air pump based the result of checking when the air pump is stopped and the supply of the negative pressure to the first valve is terminated.

11. A system for detecting a failure of an exhaust secondary air supply system of an internal combustion engine, comprising:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

a valve provided in the conduit for closing/opening the conduit;

prescribed level setting means for setting a first prescribed level which indicate a pressure below a pressure that opens the valve and a second prescribed level which indicates a second pressure above the pressure that opens the valve;

a plurality of pressure detectors including at least a first pressure detector which outputs a signal at the first prescribed level and a second pressure detector which outputs a signal at the second prescribed level; and failure detecting means for detecting a failure occurring at least one of the air pump and the valve based on operation of the air pump and the output of the pressure detectors.

12. A system according to claim 11, wherein said failure detecting means detects that a failure has occurred in the air pump if the output of the first pressure detector indicates that the pressure in the conduit is below a first prescribed level when the air pump is in operation while the valve is closed.

13. A system according to claim 11, wherein said failure detecting means detects that a failure has occurred in the valve if the output of the second pressure detector indicates that the pressure in the conduit is above the second prescribed level, when the air pump is in operation while the valve is opened.

14. A system according to claim 11, wherein said valve comprises:

a first valve which opens when a negative pressure is supplied from the engine; and a second valve which opens in response to the pressure in the conduit;

and said failure detecting means detects that a failure has occurred in the air pump based on the output of the first pressure detector when the air pump is in operation, while supply of the negative pressure is stopped.

15. A system according to claim 11, wherein said failure detecting means detects a failure has occurred at least one the air pump and the valve after a predetermined has passed since at least one of the pressure detectors generated the output.

16. A system for detecting a failure of an exhaust secondary air supply system of an internal combustion engine, comprising:

a catalytic converter installed in an exhaust pipe of an exhaust system of the engine for reducing pollutants from exhaust gases emitted from the engine;

a conduit connected, at one end, to the exhaust pipe at a location upstream of the catalytic converter;

an air pump connected to an opposite end of the conduit for supplying air in the conduit;

air pump operation control means for controlling operation of the air pump;

valve means provided in the conduit for closing/opening the conduit, the valve means comprises a first valve which opens in response to a negative pressure and a second valve which opens in response to a pressure in the conduit;

first valve operation control means for controlling operation of the first valve by supplying the negative pressure from the engine;

prescribed level setting means for setting a prescribed level above a pressure under which the second valve opens;

a pressure detector which outputs a signal when a pressure in the conduit reaches the prescribed level; and failure detecting means for checking the signal from the pressure detector successively with respect to time including at least at a first time when the supply of the negative pressure to the first valve is terminated and at a second time, which is different from the first time, when the air pump is terminated and for detecting a failure occurring at at least one of the air pump and the valve means based on a result of the checking.

17. A system according to claim 16, wherein said failure detecting means detects a failure has occurred in at least one of the first valve and the second valve based on the result of checking when the air pump is in operation while the supply of the negative pressure to the first valve is terminated.

18. A system according to claim 16, wherein said failure detecting means detects a failure has occurred in the air pump based on the result of the checking pressure detector when the air pump is stopped and the supply of the negative pressure to the first valve is terminated.

* * * * *

UNITED STATES PATENT AND TRADEMARK OFFICE
CERTIFICATE OF CORRECTION

PATENT NO. : 5,852,929

DATED : December 29, 1998

INVENTOR(S) : KATO et al.

It is certified that error appears in the above-identified patent and that said Letters Patent is hereby corrected as shown below:

On the title page,
Item [30] delete "Jul. 4, 1996" insert therefor

-- Jul. 4, 1995 --

Signed and Sealed this

Twenty-fifth Day of May, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,852,929

DATED : December 29, 1998

INVENTOR(S) : Kato et al.

It is certified that error appears in the above-identified patent and that said Letters Patent is hereby corrected as shown below:

```
Column 12, line 37, after "checking" delete "pressure
detector"
```

Signed and Sealed this

Thirty-first Day of August, 1999

Attest:

Q. TODD DICKINSON

*Attesting Officer*  *Acting Commissioner of Patents and Trademarks*